Aug. 7, 1951　　　C. A. ROESSL ET AL　　　2,562,950
FIVE-KNIFE THREE-STAGE TRIMMING MACHINE
Filed March 16, 1950　　　　　　　　　　　　　15 Sheets-Sheet 1

Inventors
Carl A. Roessl
Robert P. Jendius
by *Lell J. Gary*
Attorney

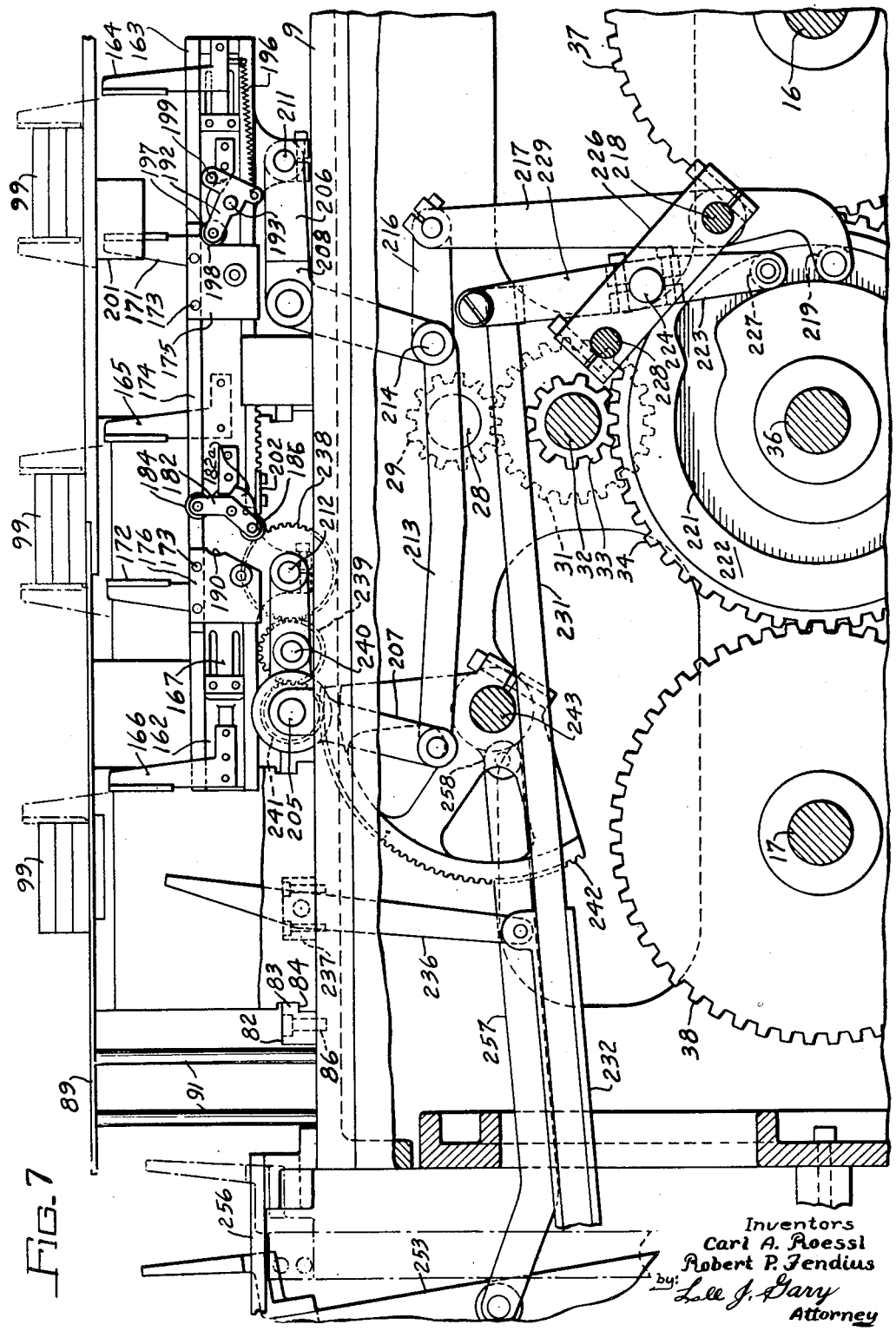

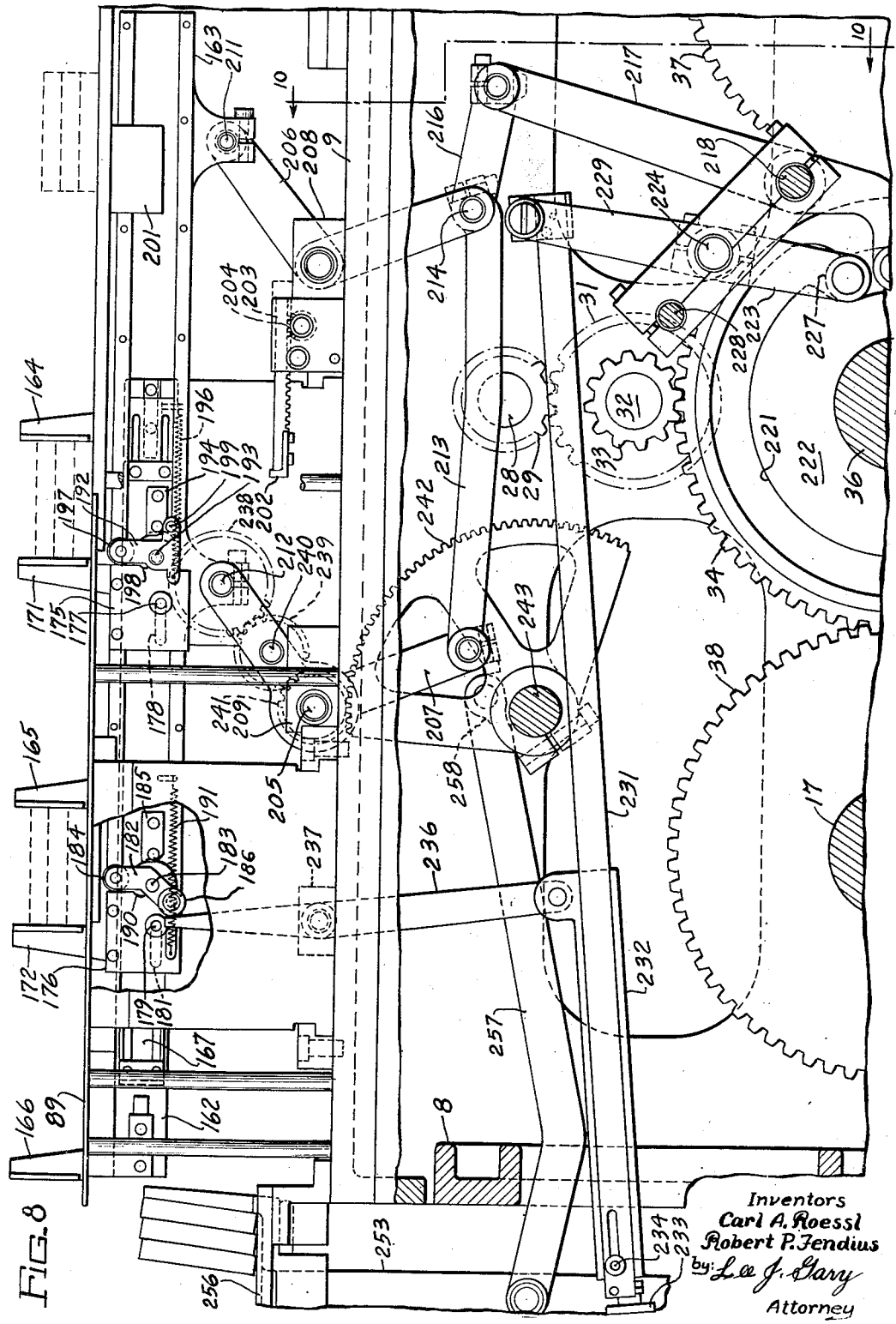

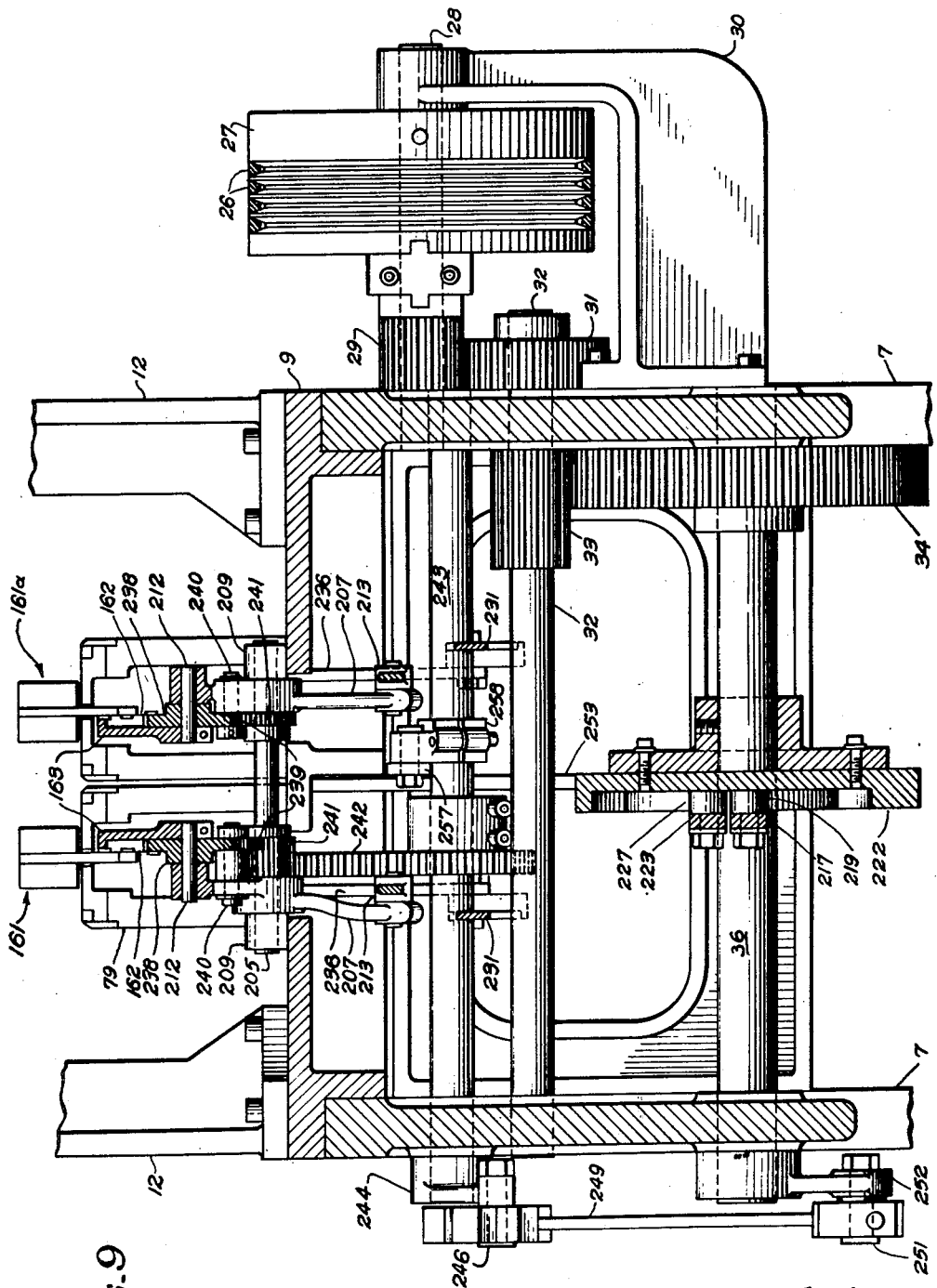

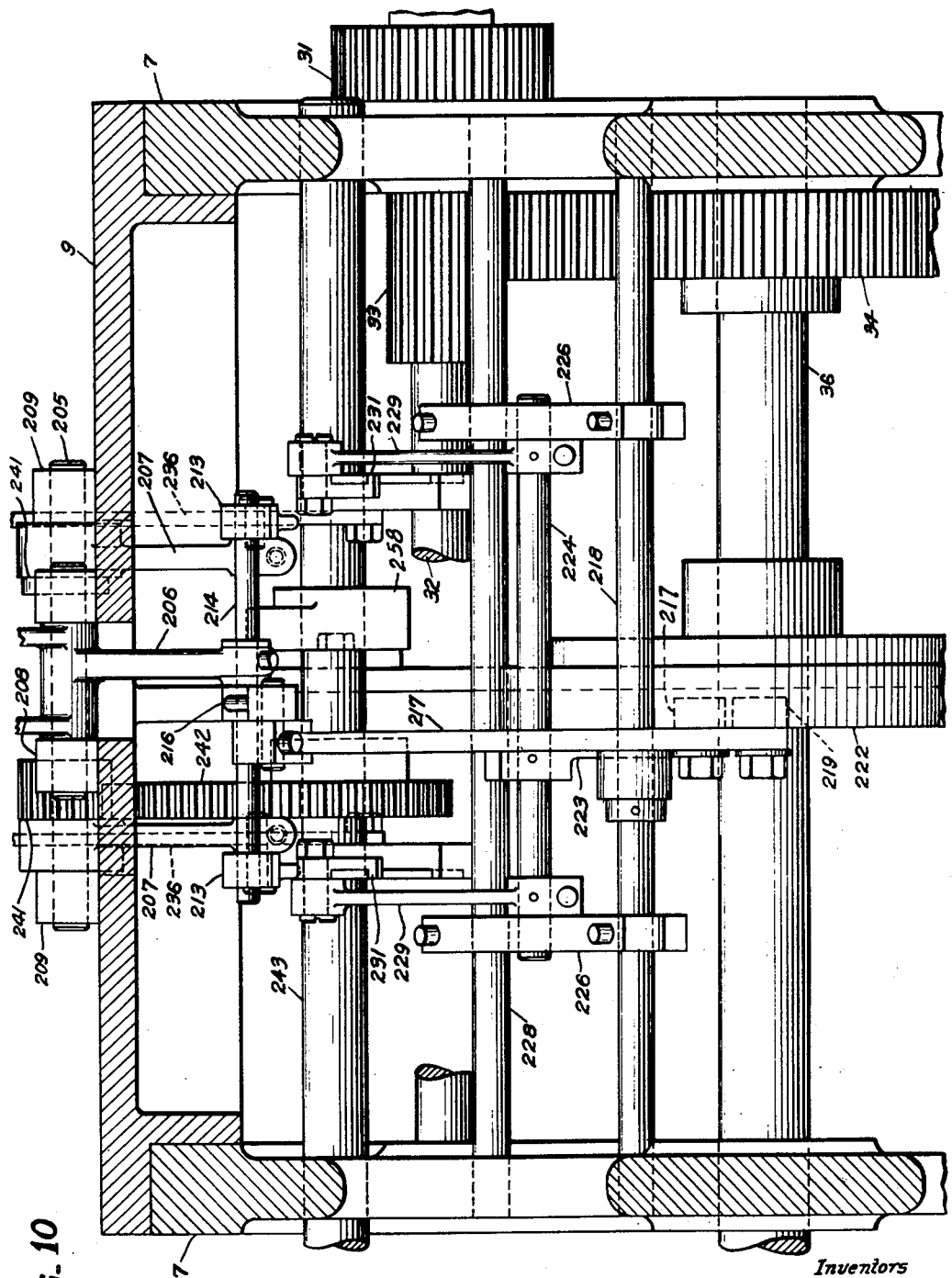

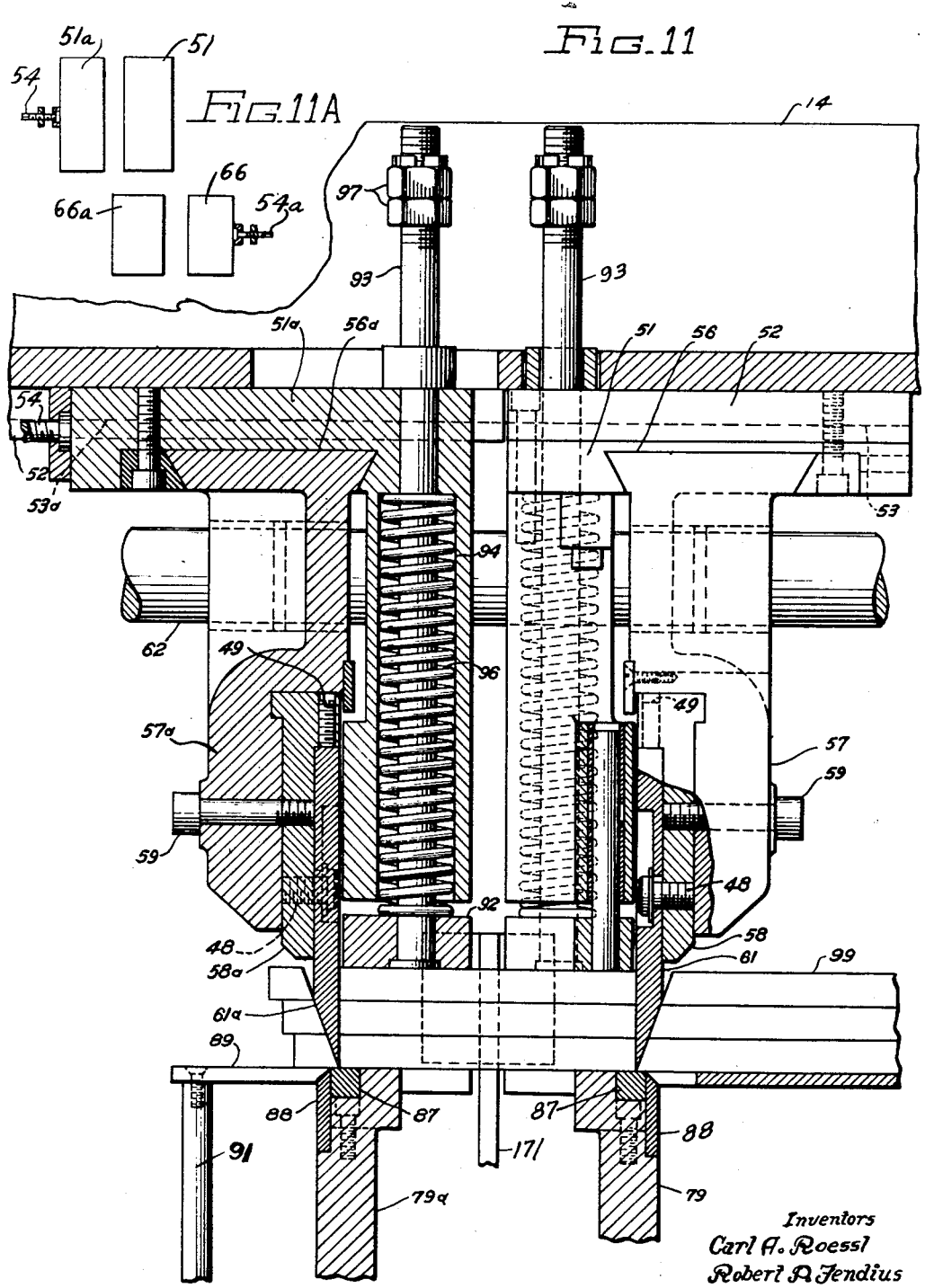

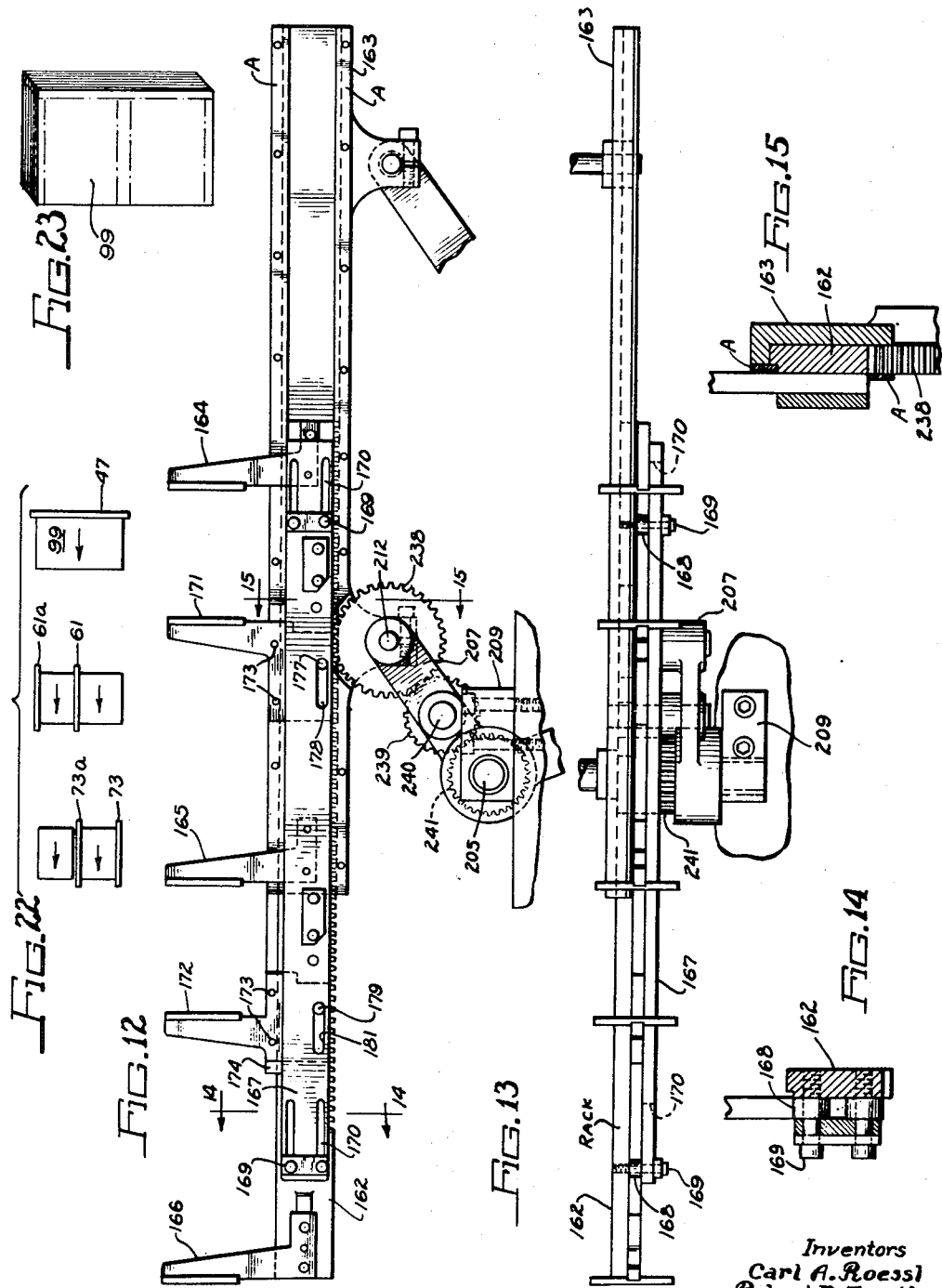

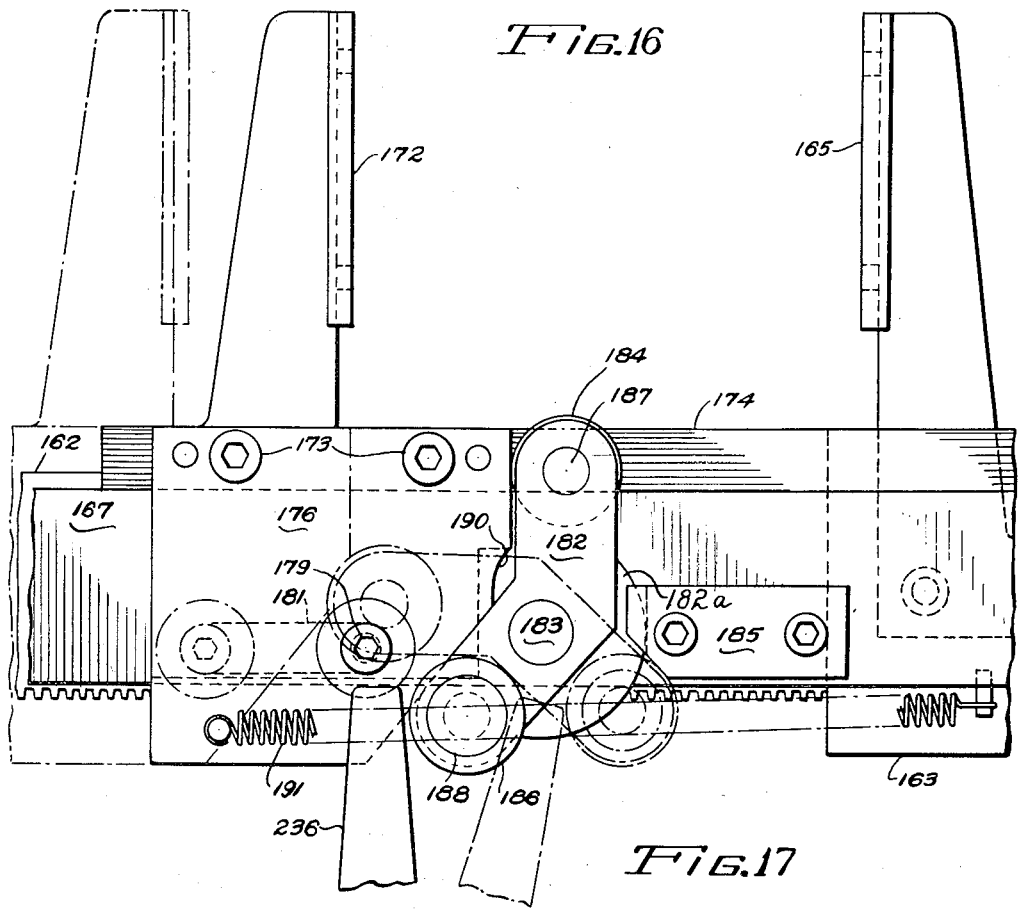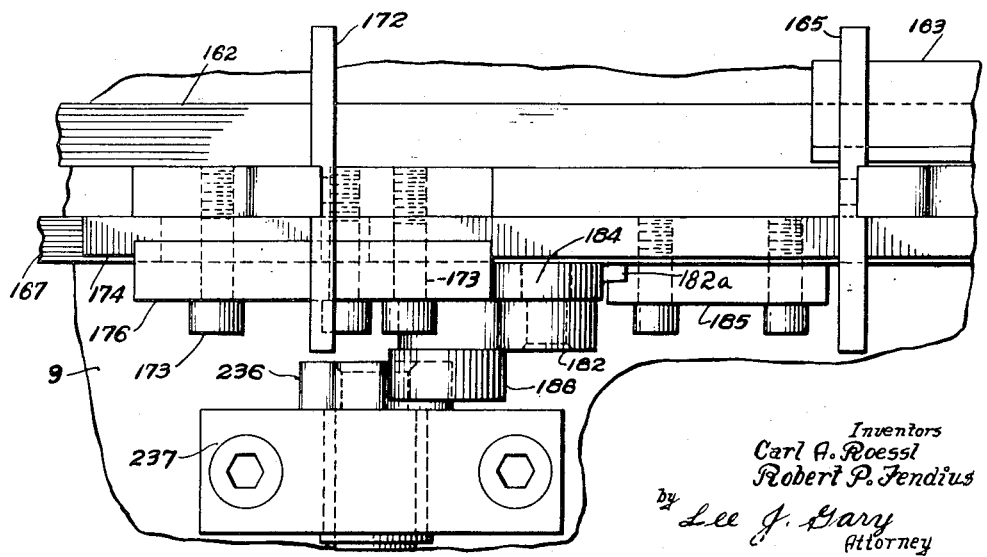

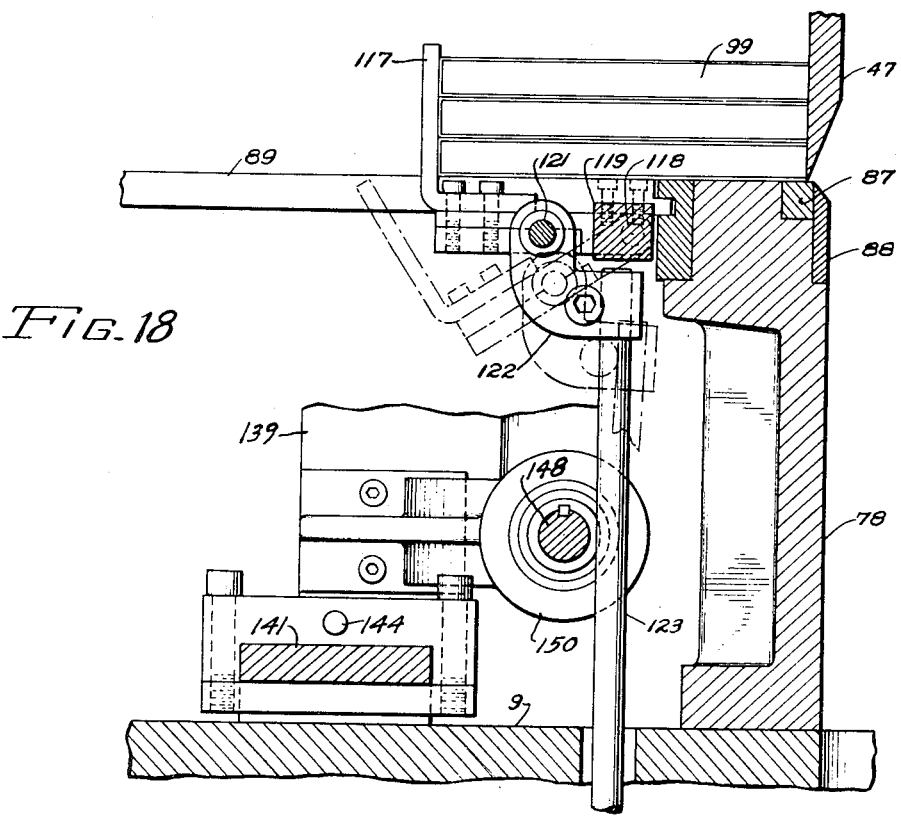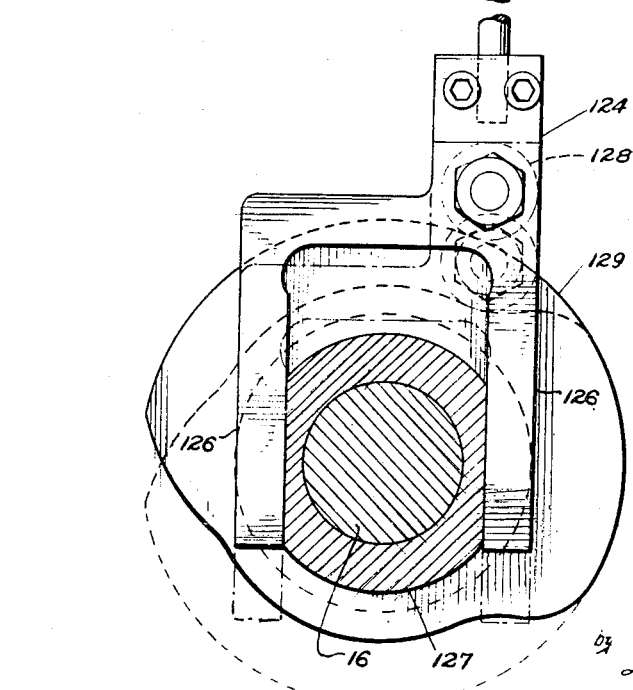

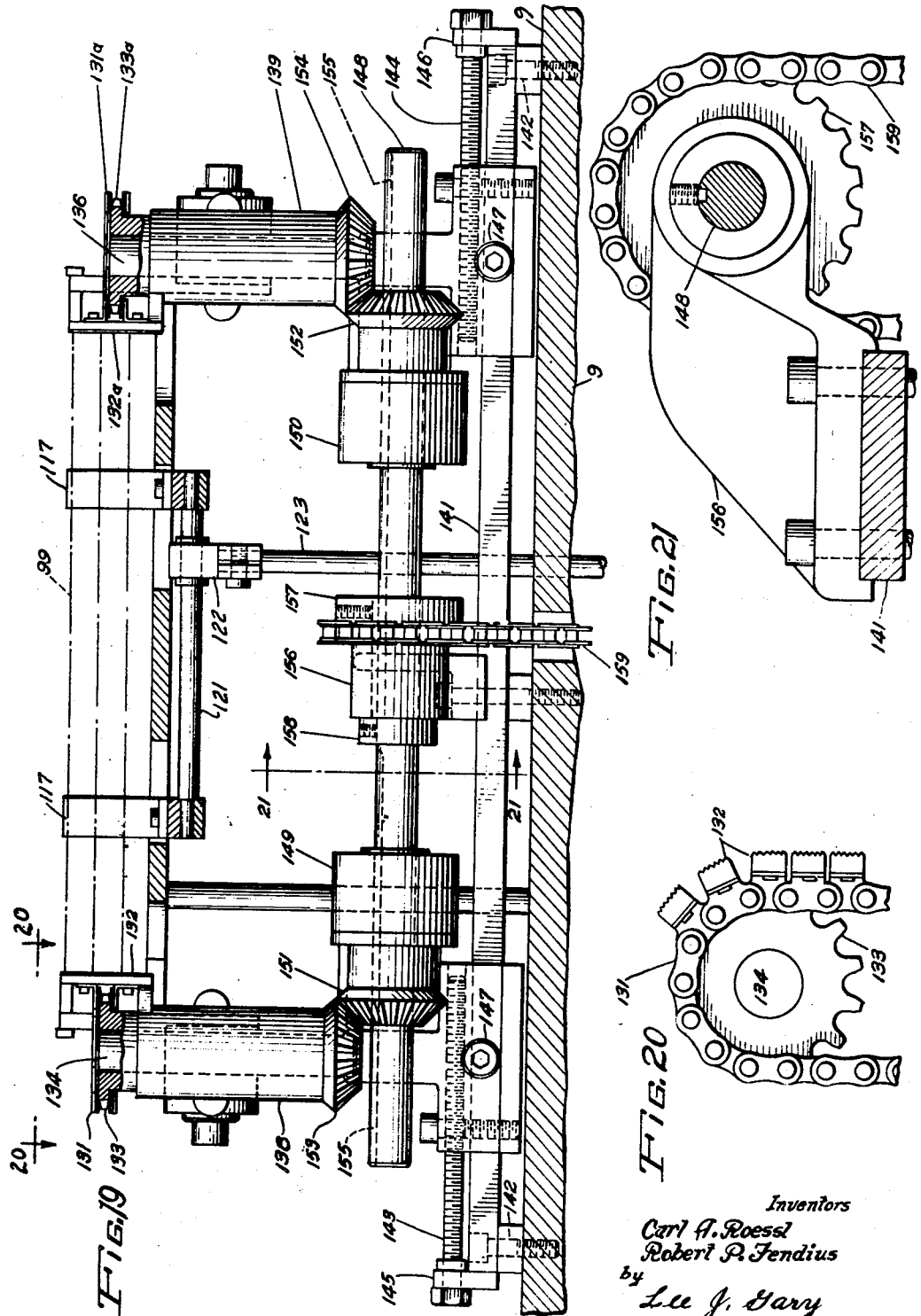

Patented Aug. 7, 1951

2,562,950

UNITED STATES PATENT OFFICE 2,562,950

FIVE-KNIFE THREE-STAGE TRIMMING MACHINE

Carl A. Roessl and Robert P. Fendius, Chicago, Ill., assignors to C. L. Moyer Company, Chicago, Ill., a corporation of Illinois Application March 16, 1950, Serial No. 150,021

19 Claims. (Cl. 164—48)

This invention relates to a five-knife three-stage trimming machine adapted for use in trimming books, catalogs, pamphlets, and the like, and is more particularly concerned with the provision of a trimming machine designed to progressively trim book units comprising a plurality of printed sheets bound together to form two complete individual books when the book unit is cut transversely intermediate its ends.

Briefly, the present invention contemplates the provision of a trimming machine in which each book unit is delivered to the first cutting stage of the machine and trimmed along its front edge by a first stage knife. The book unit is then transferred from the first cutting stage to the second cutting stage of the machine and is cut transversely by a pair of second stage cutting knives disposed in spaced parallel relation to form one completely trimmed individual book. The partially trimmed book of the book unit is then transferred from the second cutting stage to the third cutting stage of the machine and is trimmed along its head and foot by a pair of third stage cutting knives arranged in spaced parallel relation. The machine thus acts to progressively move a book unit step-by-step through three cutting stages to form two individual books trimmed along the head, foot and front edge.

This invention further contemplates the provision of an improved feed mechanism for automatically and progressively transferring the book units from the first cutting stage to the second and third cutting stages of the trimming machine.

This invention further contemplates the provision of a trimming machine adapted for use in trimming book units of various lengths, widths and thicknesses.

This invention further contemplates the provision of a trimming machine in which five knives are mounted upon a knife carrier guided for reciprocative movement above the base of the machine, the knife carrier being actuated by means of cranks and connecting rods. In order to prevent rapid dulling of the knife edges due to contact with their respective cutting blocks, abutment shoulders are directly engaged by the knife carrier to terminate each downward movement of the carrier at a predetermined point.

This invention embodies other novel features, details of construction and arrangement of parts which are hereinafter set forth in the specification and claims and illustrated in the accompanying drawings, wherein:

Fig. 1A is a detail sectional view illustrating the first-stage knife holder and the means employed for adjustably mounting a knife thereon.

Fig. 7 is an enlarged fragmentary sectional view illustrating the relation of parts of the book unit transfer mechanism employed for transferring book units from the first stage of the machine to the second and third stage of the machine, the mechanism being shown in its forward position.

Fig. 8 is an enlarged fragmentary sectional view, corresponding to Fig. 7, illustrating the book unit transfer mechanism in its rear position.

Fig. 9 is an enlarged fragmentary sectional view taken along the line 9—9 of Fig. 1.

Fig. 10 is an enlarged fragmentary sectional view taken along the line 10—10 of Fig. 8.

Fig. 11 is an enlarged detail sectional view taken along the line 11—11 of Fig. 1, showing the second stage trimming knives at the termination of their cutting stroke.

Fig. 11A is a schematic plan view illustrating the means for varying the spacing of the second and third-stage trimming knives.

Fig. 12 is a detail side elevational view illustrating the gear and rack mechanism of the book unit transfer mechanism shown in Figs. 7 and 8 in the drawings.

Fig. 13 is a top plan view of same.

Fig. 14 is a detail sectional view taken along the line 14—14 of Fig. 12.

Fig. 15 is a detail sectional view taken along the line 15—15 of Fig. 12.

Fig. 16 is an enlarged detail view showing the rear latch mechanism of the book unit transfer mechanism illustrated in Figs. 7 and 8 of the drawings.

Fig. 17 is a top plan view of same.

Fig. 18 is an enlarged detail sectional view taken along the line 18—18 of Fig. 4, illustrating the stop mechanism coacting with the first-stage trimming knife.

Fig. 19 is an enlarged detail sectional view taken along the line 19—19 of Fig. 4, illustrating the transfer mechanism employed for delivering books from the first-stage trimming knife to the book unit transfer mechanism.

Fig. 20 is an enlarged detail top plan view taken along the line 20—20 of Fig. 19.

Fig. 21 is a detail sectional view taken along the line 21—21 of Fig. 19.

Fig. 22 is a schematic view illustrating the three stages employed in trimming each book unit.

Fig. 23 is a perspective view illustrating a book unit and the method of trimming same to form two individual books.

Machine frame

Figure 1:
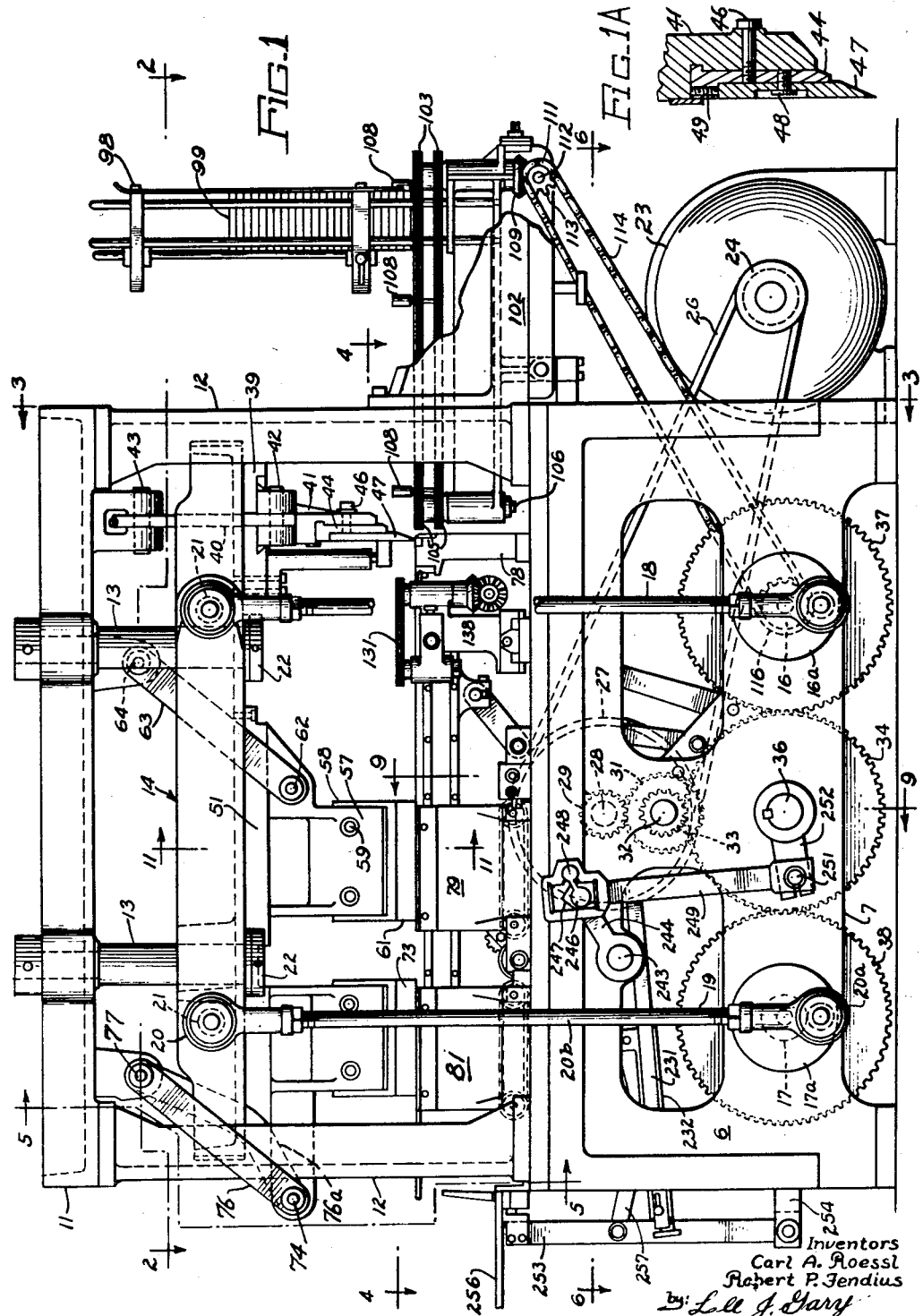
Figure 1 is a side elevational view illustrating a trimming machine embodying features of this invention.

Referring now to the drawings for a better understanding of this invention, the machine frame is shown as comprising a base 6 embodying a pair of side frame members 7—7 secured in spaced parallel relation by means of a pair of end frame members 8—8. An intermediate plate 9 is supported upon the side frame members 7—7 and is accurately machined on its upper surface to provide a smooth work face to receive and support the parts of the machine mounted thereon. In the construction of the trimming machine, it has been found desirable to first construct the base 6 and to finish the intermediate surface of the top plate 9 in order that accurate measurements may be taken from the surface of the intermediate plate to other parts of the machine.

A head 11 is supported in spaced parallel relation to the top plate 9 by means of four columns 12 disposed at the four corners of the top plate. The several parts of the machine frame thus shown and described are secured in assembled relation by means of bolts and cap screws to provide a strong rigid framework for the operating parts of the machine.

Knife carrier

Four guide rods 13 are secured in apertures provided in the head 11 to slidably engage and guide a knife carrier 14. The knife carrier 14 is reciprocated in a vertical plane along the guide rods 13 by means of a pair of crank shafts 16 and 17 formed with crank portions 16a—16a and 17a—17a, respectively. Two pairs of connecting rods 18—18 and 19—19 are journaled at their lower ends to the crank portions 16a—16a and 17a—17a, respectively, while the upper ends of the connecting rods are journaled on bosses 21 provided on the knife carrier 14. The lower ends of the guide rods 13 are threaded to receive adjustable stop collars 22 adapted to be directly engaged by the knife carrier 14 at the termination of its cutting stroke. In the assembly of the machine, the knife carrier 14 is positioned to rest upon the adjustable collars 22, and the connecting rods 18—18 and 19—19 are adjusted to draw the knife carrier into tight engagement against the adjustment collars 22, the crank portions 16a—16a and 17a—17a being disposed at the lower end of their stroke as illustrated in Fig. 1. Each connecting rod preferably comprises a pair of bearing members 20a—20a threaded to receive the reversely threaded ends of a rod 20b.

The crank shafts 16 and 17 are driven in timed relation by means of an electric motor 23 provided with a pulley 24 to drive belts 26 leading to a pulley 27 secured to a shaft 28. The shaft 28 is journaled in suitable bearings provided in a side frame 7 and a bracket 30 and has a gear 29 keyed thereto for meshing engagement with a gear 31 keyed to a shaft 32. A gear 33 is also keyed to the shaft 32 for meshing engagement with a gear 34 keyed to a shaft 36. The shafts 32 and 36 are journaled in suitable bearings provided in the side frames 7—7. As illustrated in Fig. 1, the gear 34 meshes with gears 37 and 38 which are keyed to the crank shafts 16 and 17, respectively.

Knife holders

The lower surface of the knife carrier 14 is machined to provide a smooth finished surface to receive a first-stage knife holder guide plate 39 which is secured in fixed position by means of suitable cap screws. The guide plate 39 is formed with a dovetail slot to receive the dovetail formed on a first-stage knife holder 41. The knife holder 41 is mounted for reciprocative movement transversely of the machine within the dovetail groove formed in the guide plate 39. A connecting link 40 is connected at its one end to a pivot pin 42 provided on the knife holder and is connected at its other end to a pivot pin 43 provided on the head 11. During vertical reciprocative movement of the knife carrier 14, the connecting link 40 acts to move the knife holder 41 transversely of the machine, in a draw knife action. An adapter 44 is secured to the knife holder 41 by means of cap screws 46, and a knife 47 is adjustably mounted on the adapter by means of cap screws 48 and adjustment screws 49, in the manner illustrated in Fig. 1A.

Referring now more particularly to Figs. 1, 5, 11, and 11A in the drawings, a pair of second-stage knife holder guide plates 51 and 51a are mounted on the bottom face of the knife carrier 14 by means of a pair of recessed guide bars 52—52 adapted to receive and engage tongues 53—53 and 53a—53a formed on guide plates 51 and 51a, respectively. The guide plate 51a is adjusted transversely of the machine by means of an adjustment screw 54. Guide plates 51 and 51a are formed with dovetail recesses 56 and 56a to receive the dovetail portions of knife holders 57 and 57a, respectively. Adapters 58 and 58a are secured to the knife holders 57 and 57a, respectively, by means of cap screws 59. Knives 61 and 61a are vertically adjustable on their respective adapters 58 and 58a by means of cap screws 48 and adjustment screws 49.

Figure 2:
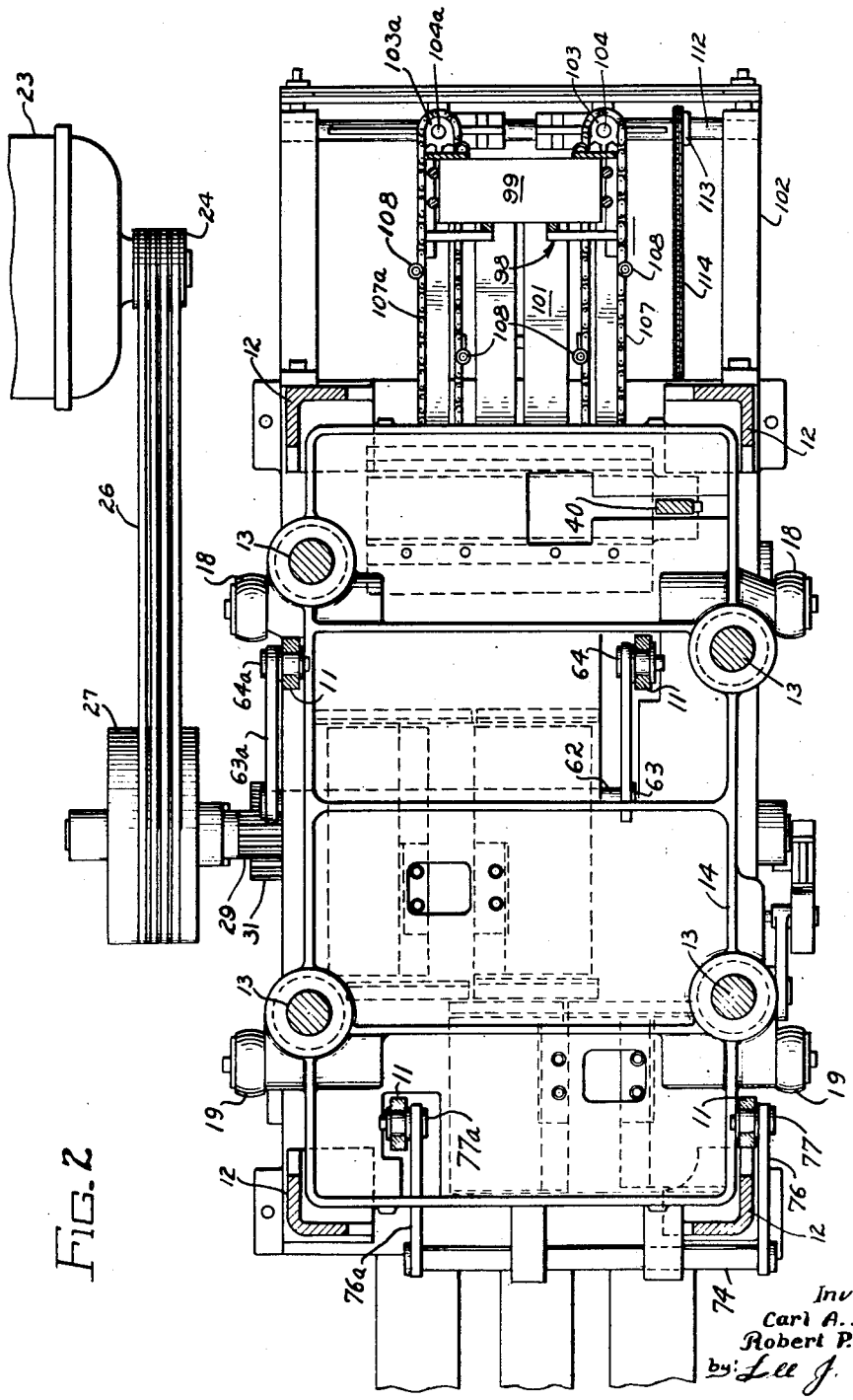
Fig. 2 is a sectional view taken along the line 2—2 of Fig. 1.
Figure 3:
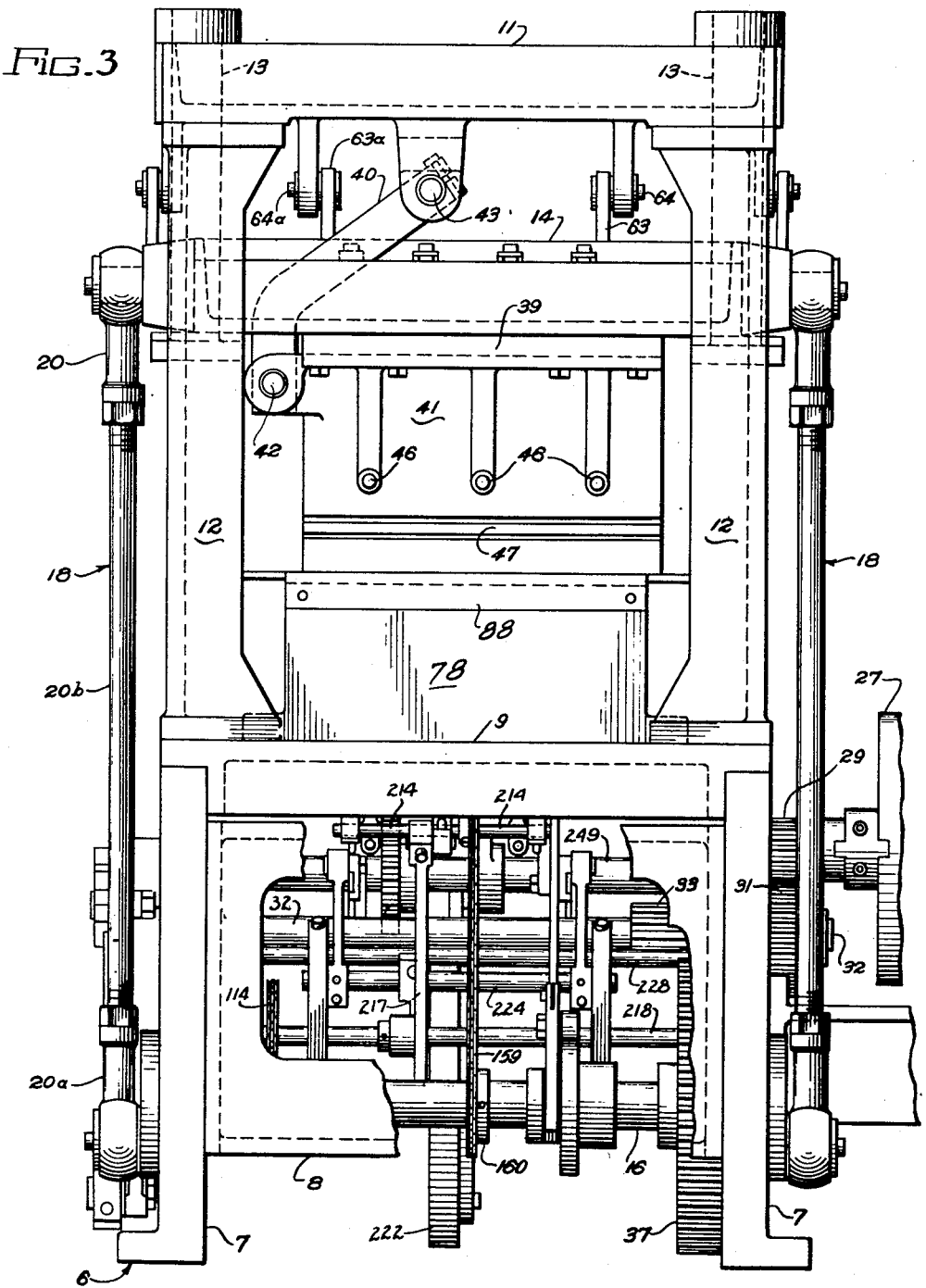
Fig. 3 is an end elevational view of the trimming machine, parts of the frame being broken away to illustrate the operating mechanism.
Figure 4:
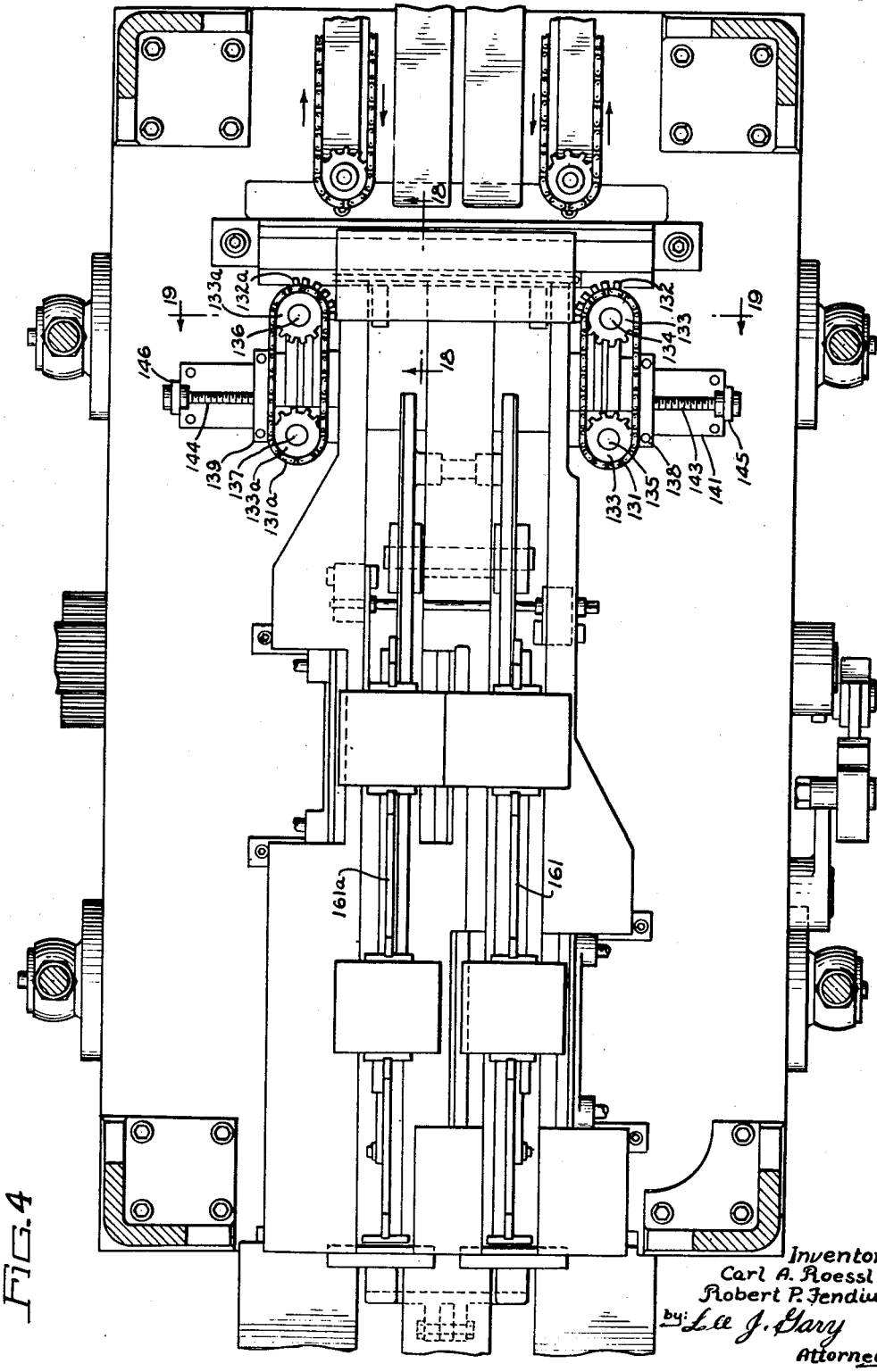
Fig. 4 is a sectional view taken along the line 4—4 of Fig. 1.

The knife holders 57 and 57a are connected for common movement through their respective dovetail grooves 56 and 56a by means of a cross shaft 62 which extends through apertures formed in the knife holders. A pair of connecting links 63 and 63a, see Figs. 1, 2 and 3, are connected at their lower ends to the cross shaft 62 and are journaled at their upper ends on pivot pins 64 and 64a provided on the head 11. During vertical movement of the knife carrier 14, it will be noted that the connecting links 63 and 63a act to impart reciprocable movement, in a draw knife action, to the knife holders 57 and 57a, respectively.

A pair of third-stage guide plates 66 and 66a are mounted on the lower surface of the knife carrier 14 by means of a pair of transversely disposed guide strips 67—67 formed with recesses to receive projecting tongue portions formed on the guide plates. The guide plate 66 is adjustable transversely of the machine by means of an adjustment screw 54a. The guide plates 66 and 66a are formed with dovetail grooves 68 and 68a to receive the dovetails formed on a pair of knife holders 69 and 69a. The knife holders 69 and 69a are provided with adapters 71 and 71a which are secured in position by means of cap screws 72. Knives 73 and 73a are adjustably positioned upon their respective adapters 71 and 71a by means of cap screws 48 and adjustment screws 49, as illustrated in Fig. 11 in the drawings.

The knife holders 69 and 69a are formed with apertures to receive a cross shaft 74. A pair of connecting links 76 and 76a are connected at their lower ends to the cross shaft 74 and are connected at their upper ends to pivot pins 77 and 77a provided on the head 11. During vertical movement of the knife carrier 14, the connecting links 76 and 76a act through the shaft 74 to impart common reciprocable movement to the knife holders 69 and 69a in a draw knife action.

Cutting tables

As illustrated in Figs. 1, 5, 7, 11 and 18 in the drawings, cutting tables 78, 79, 79a, 81 and 81a are mounted on the top plate 9 of the frame 6 under the knives 47, 61, 61a, 73 and 73a, respectively. The cutting tables 79, 79a, 81 and 81a are adapted to be adjustably positioned transversely of the machine by means of clamping strips 82 formed with tongue portions 83 for clamping engagement against abutment shoulders 84 formed on the tables (see Fig. 7). The clamping strips 82 are secured to the table top 9 by means of cap screws 86. Each of the cutting tables is provided with a cutting block 87 formed of hard fibrous material, each cutting block being secured in position upon its cutting table by means of a clamping strip 88. A book-supporting platform 89 is supported upon posts 91 extending upwardly from the top plate 9, the upper surface of the platform 89 being in a common plane with the upper surface of the cutting blocks 87.

Hold-down device

Figure 5:
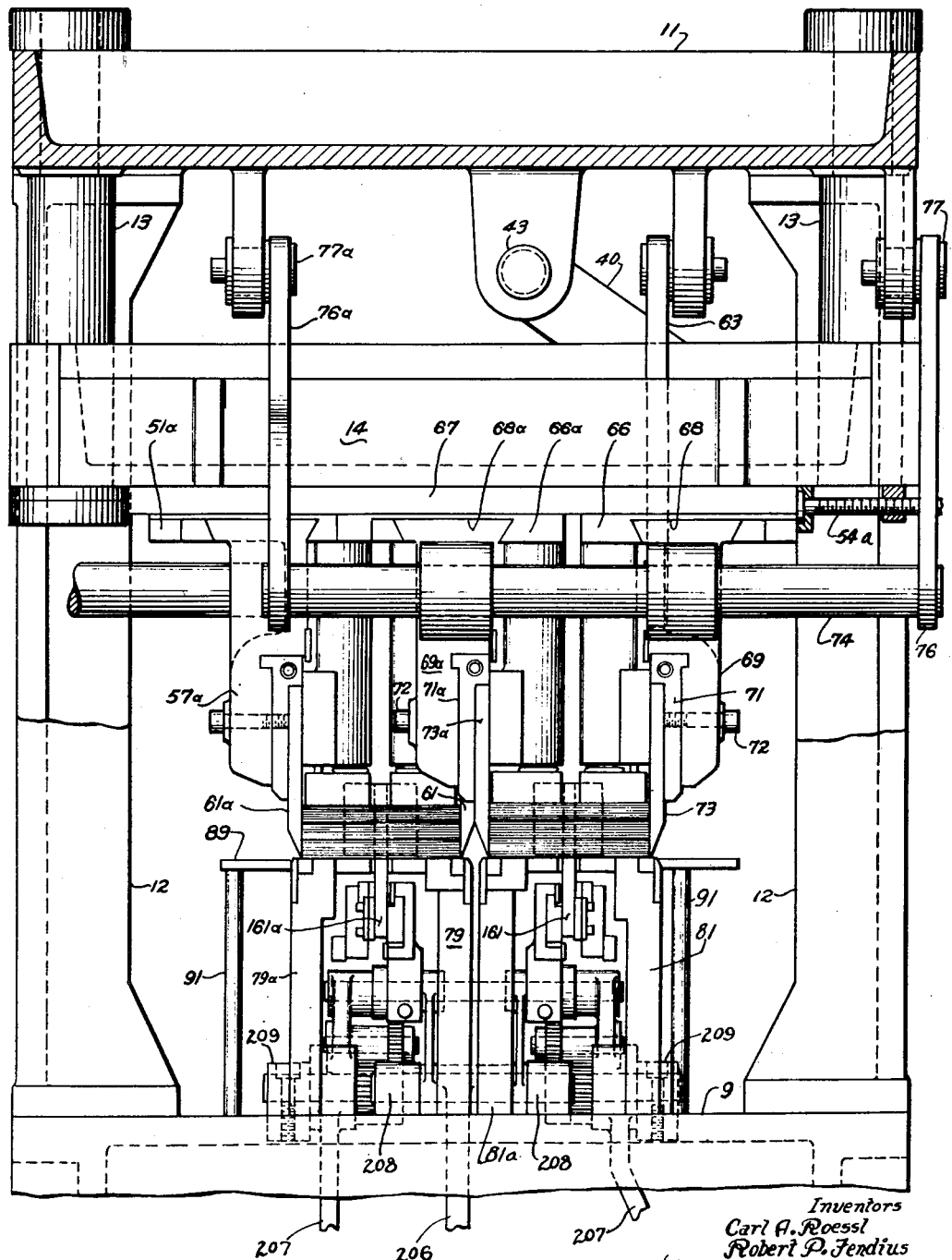
Fig. 5 is an enlarged fragmentary sectional view taken along the line 5—5 of Fig. 1.

As illustrated in Figs. 1, 5 and 11 in the drawings, each of the guide plates 39, 51, 51a, 66 and 66a is provided with a hold-down device to coact with their respective cutting tables 78, 79, 79a, 81 and 81a to hold books in position during the cutting stroke of their respective knives 47, 61, 61a, 73 and 73a. Each hold-down device comprises a hold-down bar 92 secured at the lower ends of a pair of rods 93—93 mounted for reciprocative movement within their respective guide plates. Each guide plate is formed with a pair of recesses 94—94 to receive a pair of compression springs 96—96 which act to yieldably resist movement of their hold-down bars toward their guide plates. Movement of the hold-down bars 92 away from their respective guide plates is limited by means of adjustment nuts 97 threaded onto the ends of the rods 93.

First stage book feed mechanism

Referring now more particularly to Figs. 1, 2 and 18 in the drawings, the first stage book feed mechanism, which is described and claimed in our copending application Serial No. 182,278 filed August 30, 1950, is shown as comprising a hopper, generally indicated at 98, adapted to receive a stack of book units 99 supported upon a platform 101 which in turn is mounted upon a frame 102. Two sets of driving sprockets 103—103 and 103a—103a are keyed to driving shafts 104 and 104a, respectively, journaled in the frame 102. Two sets of driven sprockets 105—105 and 105a—105a are keyed to shafts 106 and 106a, respectively, journaled in the frame 102. Two sets of endless chains 107—107 and 107a—107a are mounted on the sprockets 103—105 and 103a—105a, respectively.

Push lugs 108 are mounted at spaced intervals along the chains 107 and 107a and project upwardly therefrom to push the book units 99 from the lower end of the hopper 98 along the platform 101 toward the first stage knife 47. It will be noted that the height of the push lugs 108 determines the thickness of the stack of book units 99 displaced from the hopper 98. Bevel gears 109 and 109a are keyed to the driving shafts 104 and 104a, respectively, for meshing engagement with a pair of bevel gears 111 and 111a keyed to a shaft 112 journaled in the frame 102. A sprocket 113 is also keyed to the shaft 112 to be driven by an endless chain 114 which extends around a driving sprocket 116 keyed to the crank shaft 16.

As a stack of book units 99 are moved along the platform 101 by means of the push lugs 108 provided on the endless chains 107 and 107a, the book units are brought into engagement against a pair of first stage stop arms 117—117 which are pivotally mounted at 118 on a cross bar 119 which, in turn, is supported upon the book supporting platform 89 (see Fig. 18). The first stage stop arms 117—117 are connected for common movement by means of a cross shaft 121, the cross shaft 121 being journaled in a bearing bracket 122 mounted at the upper end of an actuating bar 123. The lower end of the bar 123 is secured to a bifurcated bracket 124 having its two arms 126—126 straddling a bushing 127 journaled on the crank shaft 16. A roller 128 is journaled on the bracket 124 for engagement by a cam 129 keyed to the shaft 16. During rotational movement of the cam 129, the first-stage stop arms 117—117 are moved into and out of the line of travel of a stack of book units 99.

Chain feed mechanism

After the stack of book units 99 has been trimmed along its front edge by the first stage cutting knife 47, the stack is engaged at its head and foot and moved rearwardly by a pair of endless sprocket chains 131—131a provided with book engaging lugs 132—132a (see Figs. 1, 4, 19, 20 and 21). The sprocket chains 131—131a are mounted on sprockets 133—133 and 133a—133a, respectively, the sprockets 133—133 being keyed to shafts 134—135 and the sprockets 133a—133a being keyed to shafts 136—137. The shafts 134—135 are journaled in a bearing bracket 138, and the shafts 136—137 are journaled in a bearing bracket 139. The bearing brackets 138 and 139 are suitably mounted upon a bracket supporting plate 141 extending transversely across the machine and secured at its ends to the upper surface of the top plate 9 by means of cap screws 142.

The bearing brackets 138 and 139 are adjustably positioned along the supporting plate 141 by means of adjustment screws 143 and 144, respectively, (see Fig. 19) journaled in thrust plates 145 and 146, respectively, the bearing brackets being provided with threaded apertures to receive the ends of the adjustment screws. The bearing brackets are secured in fixed position by means of locking screws 147 which are threaded into the brackets for engagement against the supporting plate 141.

A driving shaft 148 is journaled adjacent its ends in bearing arms 149 and 150 provided on the bearing brackets 138 and 139, respectively. Bevel gears 151 and 152 are mounted on the ends of the shaft 148 for meshing engagement with bevel gears 153 and 154 keyed to the shafts 134 and 136, respectively. The ends of the shaft 148 are provided with key ways 155—155 to receive keys secured within the bore of each of the bevel gears 151 and 152 to prevent rotational movement of the gears relative to the shaft. The medial portion of the shaft 148 is journaled in a bearing 156 secured to the supporting plate 141. A sprocket 157 and a collar 158 are secured to the shaft 148 on opposite sides of the bearing 156 and serve to prevent axial displacement of the shaft. A sprocket chain 159 leads from the sprocket 157 to a driving sprocket 160 keyed to the shaft 16.

*Rack feed mechanism*

The stack of book units 99 is delivered by the chain feed mechanism to a rack feed mechanism comprising two feed units 161—161a which are similar in construction and operation and act together to move a stack of books along the plate 89 to the second and third cutting stages of the machine. To avoid repetition, as the units 161 and 161a are similar in construction and operation, the following description of unit 161 also applies to the unit 161a.

Referring now to Figs. 7, 8, 9 and 12 to 17, each feed unit of the rack feed mechanism is shown as comprising a rack 162 mounted for reciprocative movement along a guide frame 163. Three fixed book clamping jaws 164, 156 and 166 are secured to the rack 162 by cap screws to engage the trimmed front edge of book units 99. A guide plate 167 is secured in spaced relation upon the rack 162 by means of spacing blocks 168 and cap screws 169. To permit adjustment of the guide plate 167 along the rack 162, the guide plate is provided with slots 170 to receive the screws 169.

A pair of movable clamping jaws 171 and 172 are secured by cap screws 173 to a connecting bar 174 to coact with the jaws 164 and 165, respectively, to engage book units being transferred through the second and third cutting stages of the machine. The connecting bar 174 is mounted for sliding movement along the upper edge of the guide plate 167, and the lower ends of the jaws 171 and 172 are slidably engaged between the rack 162 and the guide plate 167. Cam plates 175 and 176 are disposed for sliding movement along the outer face of the guide plate 167 and are secured to the movable clamping jaws 171 and 172, respectively, and to the connecting bar 174 by means of cap screws 173. A cap screw 177 extends through the cam plate 175 and thence through a slot 178 in the guide plate 167 for threaded engagement in the lower end of the clamping jaw 171. A cap screw 179 extends through the cam plate 176 and thence through a slot 181 in the guide plate 167 for threaded engagement in the lower end of the clamping jaw 172.

A cam member 182 is pivotally mounted intermediate its ends on a pivot pin 183 provided on the guide plate 167, the ends of the cam member being provided with rollers 184 and 186 journaled on pins 187 and 188, respectively (see Figs. 16 and 17). The cam member is engaged against excessive outward displacement from its pivot pin by means of a limit plate 185 (see Figs. 16 and 17) secured to the guide plate 167. The end of the limit plate is disposed for sliding engagement against a circular portion 182a formed on the cam member 182. When the cam member 182 is pivoted in a counterclockwise direction, as illustrated in Fig. 16, the roller 184 acts against the cam face 189 of the cam plate 176 to move the latter rearwardly until the roller is seated in a locking recess 190 at the lower end of the cam face. It will be noted that the cam member 182 thus acts to move the clamping jaw 172 away from its companion jaw 165. As the movable clamping jaws 172 and 171 are secured to each other by the connecting bar 174, movement of the clamping jaw 172 will also cause movement of the clamping jaw 171 relative to its companion jaw 164. A tension spring 191 is connected at its one end to the cam plate 176 and at its other end to the guide plate 167 to yieldably resist movement of the clamping jaws 172 and 171 away from their companion jaws 165 and 164.

A latch 192 (see Figs. 7 and 8) is journaled for pivotal movement on a pin 193 provided on the guide plate 167 and is engaged against excessive outward displacement from its pin by a limit plate 194 secured to the guide plate. A tension spring 196 is connected at its one end to the lower end of the latch and is connected at its other end to the guide plate 167 to yieldably resist pivotal movement of the latch in a clockwise direction. A roller 197 is journaled on the upper end of the latch for engagement in a latch recess 198 formed in the cam plate 175 when the cam member 182 moves the movable clamping jaws 171 and 172 to their open position.

A trip pin 199 is provided on the right hand end of the latch 192 for engagement by a trip plate 201 to cause the latch to pivot in a clockwise direction to thus move the roller 197 from its locked position within the recess 198 formed in the cam plate 175. A trip arm 202 is provided on the top plate 9 for engagement with the roller 186 on the cam member 182 to pivot the latter in a clockwise direction to move the roller 184 out of the locking recess 190 formed in the cam plate 176. The trip arm 202 is in the form of a rack slidably mounted in a base 203 and actuated by a rack gear 204 to adjust the position of the trip arm.

The rack feed units 161 and 161a are supported in spaced parallel relation above the table top 9 by means of a front bell crank lever 206 and a pair of rear bell crank levers 207—207, the lever 206 being journaled in bearings 208—208 and the levers 207—207 being keyed to a shaft 205 journaled in bearings 209—209. The front ends of the feed units 161—161a are connected together by a crosspin 211 and one end of the bell crank lever 206 is journaled on the cross pin. Pivot pins 212—212 are provided on the guide frame 163 of each feed unit 161—161a to pivotally engage the upper ends of their respective bell crank levers 207—207.

A pair of connecting rods 213—213 are pivotally connected at their back ends to the lower ends of their respective bell crank levers 207—207 and are secured at their front ends to a cross shaft 214. The lower end of the bell crank lever 206 is journaled on the cross shaft 214. A connecting link 216 is journaled at its one end on the shaft 214 and has its other end pivotally connected to the upper end of a cam actuated lever 217. The lever 217 is journaled on a shaft 218 supported at its ends in the side frame members 7—7. A roller 219 is journaled on the lower end of the lever 217 and engaged within the track 221 of a box cam 222 keyed to the shaft 36.

A lever 223 is secured to a shaft 224 journaled at its ends in a pair of bearings 226—226. A roller 227 is journaled on a pin provided at the end of the lever 223 and is disposed within the cam track 221 of the cam 222. Each of the bearings 226—226 is supported at its one end on the shaft 218 and at its other end on a shaft 228 which, in turn, is supported at its ends by the side frames 7—7. A pair of levers 229—229 are secured to the shaft 224 and have their outer ends pivotally connected to a pair of connecting bars 231—231 which, in turn, are engaged within elongated recesses formed in a pair of holders 232—232. The connecting bars 231—231 are adjustably positioned along their respective holders 232—232 by means of adjustment screws 233—233 and set screws 234—234. The holders 232—232 are pivotally connected to the lower ends of a pair of levers 236—236 which, in turn, are supported for pivotal movement on bearings 237—237 provided on the table top 9. As illustrated in Figs. 8, 16 and 17 the upper ends of the levers 236—236 act against their respective rollers 186—186 on the cam members 182—182 to move the movable clamping jaws of the rack feed units 161—161a away from their companion clamping jaws.

The racks 162—162 of the units 161—161a are driven in timed relation by a pair of gears 238—238 journaled on pins 212—212 (see Fig. 9). Gears 239—239 mesh with their respective gears 238—238 and are journaled on pins 240—240 provided on the bell crank levers 207—207. A pair of gears 241—241 are keyed to the shaft 205 for meshing engagement with their respective gears 239—239. A gear segment 242 meshes with the gear 241 of feed unit 162 and is keyed to a shaft 243 journaled at its ends in the side frame members 7—7.

Figure 6:
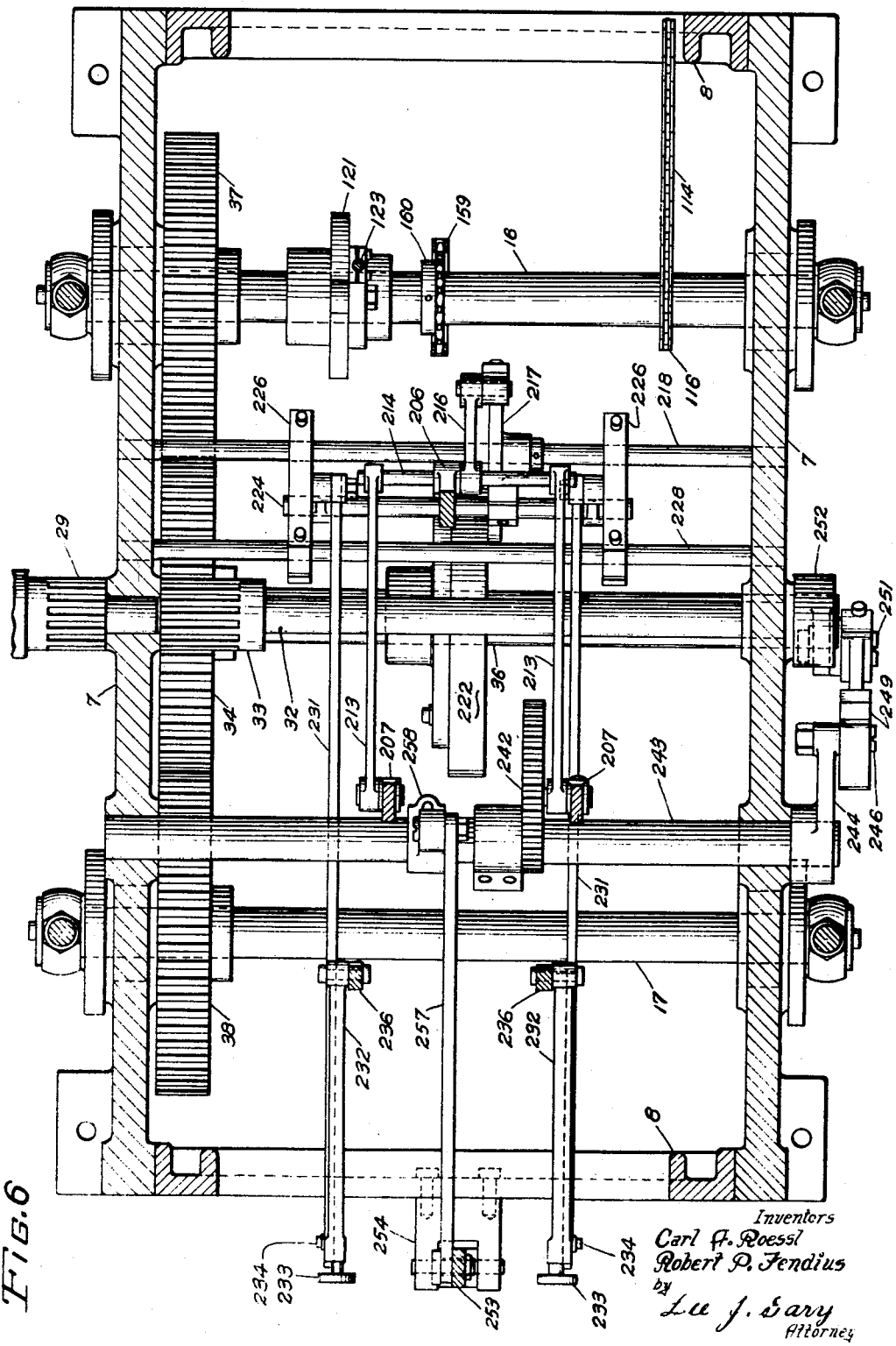
Fig. 6 is a sectional view taken along the line 6—6 of Fig. 1.

Referring now to Figs. 1, 6 and 9, a lever 244 is keyed to the shaft 243 and is provided at its end with a pin 246 journaled in a lost-motion block 247 which, in turn, is journaled at 248 in the upper end of a connecting rod 249. The lower end of the connecting rod is journaled on a pin 251 mounted on the end of a crank arm 252 keyed to the shaft 36.

As illustrated in Figs. 1, 6, 7 and 8, a pusher arm 253 is pivotally mounted at its lower end upon a bracket 254 and has its upper end projecting upwardly through a slot in a book receiving table 256 to engage and move trimmed books. A connecting rod 257 is pivotally connected at its one end to the medial portion of the pusher arm and is pivotally connected at its other end to a lever 258 keyed to the shaft 243.

*Operation*

In the operation of the trimming machine, the book units 99 are conveyed from the hopper 98 to the first stage cutting knife 47 by means of the lugs 108 provided on the endless feed chains 107—107a. During downward movement of the knife carrier 14 the first stage cutting knife 47 acts to trim the front edge of the book unit 99. It will be noted that the connecting link 40 acts to impart a draw-cut action to the knife 47 during the trimming stroke.

After the book unit 99 has been trimmed along its front edge it is engaged at its head and foot by the opposing lugs 132—132a on the endless chains 131—131a and moved rearwardly along the table 89 for engagement by the rack feed units 161—161a. As illustrated in Figs. 7 and 8, the rack feed units 161—161a are moved up and down by means of the box cam 222 which acts through the lever 217, connecting link 216 and bell crank levers 206 and 207—207. As the rack feed units move upwardly, as illustrated in Fig. 7, the book clamping jaws 164—171 and 165—172 are in their open positions to receive one or more book units 99. When the rack feed units reach their upper position a trip plate 201 acts against the trip pin 199 on the latch 192 to rotate the latter in a clockwise direction and thus move the roller 197 from its latch recess 198. The tension spring 191 then acts to move the front plate 167 toward the front of the machine to bring the movable clamping jaws 171 and 172 toward their companion jaws 164 and 165.

After the book units have been engaged between the clamping jaws the rack 162 is moved toward the rear of the machine to move the book units from the first cutting stage to the second cutting stage of the machine. This is accomplished by means of the crank 252 keyed to the shaft 36 to act through the connecting rod 249, lever 244, shaft 243, gear segment 242 and gears 241, 240 and 238. When the book units are disposed at the second cutting stage of the machine the second stage trimming knives 61—61a act to trim one end of the book unit and to divide the book unit transversely intermediate its ends to thus form one completely trimmed book.

After the cutting stroke the upper end of the lever 236 acts against the roller 186 on the cam member 182 to pivot the latter in a counterclockwise direction (see Figs. 8 and 16). The roller 184 on the cam member 182 acts against the cam plate 176 to move the latter rearwardly until the roller 184 is seated in the locking recess 190. It will be noted that this movement of the cam plate 176 moves the movable clamping jaw 165. As the cam plate 176 is connected to the plate 175 by means of the connecting bar 174, movement of the cam plate also acts to move the movable clamping jaw 171 away from its companion jaw 164. During rearward movement of the plate 175 the tension spring 196 acts to pivot the latch member 192 in a counterclockwise direction until its roller 197 is disposed in the locking recess 198 formed in the plate 175. When the clamping jaws are thus moved to their open positions, the rack feed units 161—161a move downwardly, leaving the book units at rest upon the platform 89. When the rack feed units reach their lower position, the racks 162—162 are moved toward the front of the machine by the action of the gear segment 242 through the chain of gears 241, 239 and 238. During movement of the rack toward the front of the machine the trip arm 202 acts against the roller 186 to pivot the cam member 182 in a clockwise direction to move the roller 184 out of the locking recess 190. During upward movement of the rack feed mechanism the trip plate 201 acts against the trip pin 199 to pivot the latch member 192 in a clockwise direction to move the roller 197 out of the locking recess 198. The tension spring 191 then acts to move the front plate 167 and its movable clamping jaws 171 and 172 toward their companion jaws 164 and 165.

The rack feed units 161—161a act in the manner thus described in transferring book units from the second cutting stage to the third cutting stage, the trimming knives 73 and 73a act to trim the head and foot of the untrimmed individual book. After the third stage trimming operation the push arm 166 on the rack 162 acts to move the two completely trimmed books rearwardly along the table 89 onto the discharge table 250. The lever 253 is actuated to move the trimmed books rearwardly along the discharge table 250.

While this invention has been shown in but one form, it is obvious to those skilled in the art that it is not so limited but is susceptible of various changes and modifications without departing from the spirit and scope of the claimed invention.

We claim as our invention:

1. In a book trimming machine, a base, book supporting means provided on said base, a knife carrier mounted for reciprocative movement toward and away from said base, means to actuate said knife carrier, five knives carried by said knife carrier, said knives being progressively arranged in three cutting stages to form and trim two individual books from a single book unit to form two books, a first knife being disposed at the first cutting stage to trim the book unit along its front edge, a pair of knives arranged in spaced parallel relation at the second cutting stage to cut the book unit transversely intermediate its ends to form one completely trimmed individual book and one untrimmed individual book, and another pair of knives arranged in spaced parallel relation at the third cutting stage to trim the head and foot of the untrimmed individual book.

2. In a book trimming machine, a base, book supporting means provided on said base, a knife carrier mounted for reciprocative movement toward and away from said base, means to actuate said knife carrier, five knives carried by said knife carrier, said knives being progressively arranged in three cutting stages to form and trim two individual books from a single book unit to form two books, a first knife being disposed at the first cutting stage to trim the book unit along its front edge, a pair of knives arranged in spaced parallel relation at the second cutting stage to cut the book unit transversely intermediate its ends to form one completely trimmed individual book and one untrimmed individual book, and another pair of knives arranged in spaced parallel relation at the third cutting stage to trim the head and foot of the untrimmed individual book, and feed means to progressively move said books from stage to stage along said book supporting means after each cutting stroke of the knife carrier.

3. In a book trimming machine, a base, book supporting means provided on said base, a knife carrier mounted for reciprocative movement toward and away from said base, means to actuate said knife carrier, five knives carried by said knife carrier, said knives being progressively arranged in three cutting stages to form and trim two individual books from a single book unit to form two books, a first knife being disposed at the first cutting stage to trim the book unit along its front edge, a pair of knives arranged in spaced parallel relation at the second cutting stage to cut the book unit transversely intermediate its ends to form one completely trimmed individual book and one untrimmed individual book, another pair of knives arranged in spaced parallel relation at the third cutting stage to trim the head and foot of the untrimmed individual book, and feed means to progressively move said books from stage to stage along said book supporting means after each cutting stroke of the knife carrier, said feed means including pairs of coacting clamping jaws arranged to engage the back and front edges of books being trimmed.

4. In a book trimming machine, a base, book supporting means provided on said base, a knife carrier mounted for reciprocative movement toward and away from said base, means to actuate said knife carrier, five knives carried by said knife carrier, said knives being progressively arranged in three cutting stages to form and trim two individual books from a single book unit to form two books, a first knife being disposed at the first cutting stage to trim the book unit along its front edge, a pair of knives arranged in spaced parallel relation at the second cutting stage to cut the book unit transversely intermediate its ends to form one completely trimmed individual book and one untrimmed individual book, another pair of knives arranged in spaced parallel relation at the second cutting stage to trim the head and foot of the untrimmed individual book, feed means to progressively move said books from stage to stage along said book supporting means after each cutting stroke of the knife carrier, said feed means including pairs of coacting clamping jaws arranged to engage the back and front edges of books being trimmed, and means to actuate said clamping jaws.

5. In a book trimming machine, a base, book supporting means provided on said base, a knife carrier mounted for reciprocative movement toward and away from said base, means to actuate said knife carrier, five knives carried by said knife carrier, said knives being progressively arranged in three cutting stages to form and trim two individual books from a single book unit to form two books, a first knife being disposed at the first cutting stage to trim the book unit along its front edge, a pair of knives arranged in spaced parallel relation at the second cutting stage to cut the book unit transversely intermediate its ends to form one completely trimmed individual book and one untrimmed individual book, another pair of knives arranged in spaced parallel relation at the third cutting stage to trim the head and foot of the untrimmed individual book, feed means to progressively move said books from stage to stage along said book supporting means after each cutting stroke of the knife carrier, said feed means including a pair of similar feed units arranged in spaced parallel relation, each feed unit having two pair of clamping jaws arranged to engage the back and front edges of books, and means to actuate said clamping jaws to progressively move books to the second and third cutting stages of the machine.

6. In a book trimming machine, a base, book supporting means provided on said base, a knife carrier mounted for reciprocative movement toward and away from said base, means to actuate said knife carrier, five knives carried by said knife carrier, said knives being progressively arranged in three cutting stages to form and trim two individual books from a single book unit printed and bound to form two books, a first knife being disposed to trim the book unit along its front edge, a pair of knives arranged in spaced parallel relation to cut the book unit transversely intermediate its ends to form one completely trimmed individual book and one untrimmed individual book, another pair of knives arranged in spaced parallel relation to trim the head and foot of the untrimmed individual book, feed means to progressively move said books from stage to stage along said book supporting means after each cutting stroke of the knife carrier, said feed means including a pair of similar feed units arranged in spaced parallel relation, each feed unit having two pair of clamping jaws arranged to engage the back and front edges of books, means to actuate said clamping jaws to progressively move books to the second and third cutting stages of the machine, and conveyor means to engage the head and foot of a book unit and to deliver the latter from the first cutting stage into position to be engaged by said clamping jaws.

7. In a book trimming machine, a base, book supporting means provided on said base, a knife carrier mounted for reciprocative movement toward and away from said base, means to actuate said knife carrier, five knives carried by said knife carrier, said knives being progressively arranged in three cutting stages to form and trim two individual books from a single book unit printed and bound to form two books, a first knife being disposed to trim the book unit along its front edge, a pair of knives arranged in spaced parallel relation to cut the book unit transversely intermediate its ends to form one completely trimmed individual book and one untrimmed individual book, another pair of knives arranged in spaced parallel relation to trim the head and foot of the untrimmed individual book, feed means to progressively move said books from stage to stage along said book supporting means after each cutting stroke of the knife carrier, said feed means including a pair of similar feed units arranged in spaced parallel relation, each feed unit having two pair of clamping jaws arranged to engage the back and front edges of books, means to actuate said clamping jaws to progressively move books to the second and third cutting stages of the machine, said last mentioned means including means to raise and lower said feed units, and reciprocative means to move said clamping jaws to the second and third cutting stages when the feed units are in their raised position and to move the clamping jaws in a reverse direction when the feed units are in their lower position.

8. In a book trimming machine, a base, book supporting means provided on said base, a knife carrier mounted for reciprocative movement toward and away from said base, means to actuate said knife carrier, five knives carried by said knife carrier, said knives being progressively arranged in three cutting stages to form and trim two individual books from a single book unit printed and bound to form two books, a first knife being disposed to trim the book unit along its front edge, a pair of knives arranged in spaced parallel relation to cut the book unit transversely intermediate its ends to form one completely trimmed individual book and one untrimmed individual book, another pair of knives arranged in spaced parallel relation to trim the head and foot of the untrimmed individual book, feed means to progressively move said books from stage to stage along said book supporting means after each cutting stroke of the knife carrier, said feed means including a pair of similar feed units arranged in spaced parallel relation, each feed unit having two pair of clamping jaws arranged to engage the back and front edges of books, means to actuate said clamping jaws to progressively move books to the second and third cutting stages of the machine, said last mentioned means including means to raise and lower said feed units, and reciprocative means to move said clamping jaws to the second and third cutting stages when the feed units are in their raised position and to move the clamping jaws in a reverse direction when the feed units are in their lower position, and means to open and close said pairs of clamping jaws.

9. In a book trimming machine, a base, book supporting means provided on said base, a knife carrier mounted for reciprocative movement toward and away from said base, means to actuate said knife carrier, five knives carried by said knife carrier, said knives being progressively arranged in three cutting stages to form and trim two individual books from a single book unit printed and bound to form two books, a first knife being disposed to trim the book unit along its front edge, a pair of knives arranged in spaced parallel relation to cut the book unit transversely intermediate its ends to form one completely trimmed individual book and one untrimmed individual book, another pair of knives arranged in spaced parallel relation to trim the head and foot of the untrimmed individual book, feed means to progressively move said books from stage to stage along said book supporting means after each cutting stroke of the knife carrier, said feed means including a pair of similar feed units arranged in spaced parallel relation, each feed unit having two pair of clamping jaws arranged to engage the back and front edges of books, means to actuate said clamping jaws to progressively move books to the second and third cutting stages of the machine, said last mentioned means including means to raise and lower said feed units, reciprocative means to move said clamping jaws to the second and third cutting stages when the feed units are in their raised position and to move the clamping jaws in a reverse direction when the feed units are in their lower position, said last mentioned means including cam actuated means to open said pairs of clamping jaws, and resilient means to close said pairs of clamping jaws.

10. In a book trimming machine, a base, book supporting means provided on said base, book engaging means to engage and progressively move books step by step to three cutting stages on said book supporting means, a knife carrier mounted for reciprocative movement toward and away from said base, means to actuate said knife carrier, five knives mounted on said knife carrier, one knife being disposed at the first cutting stage to trim the front edge of a book unit, two knives being disposed at the second stage to cut a first book from the book unit, and two knives being disposed at the third stage to cut a second book from the book unit.

11. In a book trimming machine, a base, book supporting means provided on said base, book engaging means to engage and progressively move books step by step to three cutting stages on said book supporting means, a knife carrier mounted for reciprocative movement toward and away from said base, means to actuate said knife carrier, five knives mounted on said knife carrier, one knife being disposed at the first cutting stage to trim the front edge of a book unit, two knives being disposed at the second stage to cut a first book from the book unit, two knives being disposed at the third stage to cut a second book from the book unit, said book engaging means including pairs of clamping jaws, one jaw of each pair being movable relative to its companion jaw whereby a book may be engaged at its back and front edge between the jaws.

12. In a book trimming machine, a base, book supporting means provided on said base, book engaging means to engage and progressively move books step by step to three cutting stages on said book supporting means, a knife carrier mounted for reciprocative movement toward and away from said base, means to actuate said knife carrier, five knives mounted on said knife carrier, one knife being disposed at the first cutting stage to trim the front edge of a book unit, two knives being disposed at the second stage to cut a first book from the book unit, two knives being disposed at the third stage to cut a second book from the book unit, said book engaging means including pairs of clamping jaws, one jaw of each pair being movable relative to its companion jaw whereby a book may be engaged at its back and front edge between the jaws, and means to actuate said pairs of clamping jaws to engage and disengage books disposed therebetween and to transfer the books from one stage to a subsequent stage of the machine.

13. In a book trimming machine, a base, book supporting means provided on said base, book engaging means to engage and progressively move books step by step to three cutting stages on said book supporting means, a knife carrier mounted for reciprocative movement toward and away from said base, means to actuate said knife carrier, five knives mounted on said knife carrier, one knife being disposed at the first cutting stage to trim the front edge of a book unit, two knives being disposed at the second stage to cut a first book from the book unit, two knives being disposed at the third stage to cut a second book from the book unit, said book engaging means including pairs of clamping jaws, one jaw of each pair being movable relative to its companion jaw whereby a book may be engaged at its back and front edge between the jaws, said last mentioned means including cam actuated means to open the pairs of clamping jaws, and resilient means to close the pairs of clamping jaws.

14. In a book trimming machine, a base, book supporting means provided on said base, book engaging means to engage and progressively move books step by step to three cutting stages on said book supporting means, a knife carrier mounted for reciprocative movement toward and away from said base, means to actuate said knife carrier, five knives mounted on said knife carrier, one knife being disposed at the first cutting stage to trim the front edge of a book unit, two knives being disposed at the second stage to cut a first book from the book unit, two knives being disposed at the third stage to cut a second book from the book unit, said book engaging means including pairs of clamping jaws, one jaw of each pair being movable relative to its companion jaw whereby a book may be engaged at its back and front edge between the jaws, and a pair of endless chains to engage the head and foot of a book and to move the latter along the book supporting means into position to be engaged by said clamping jaws.

15. In a book trimming machine, a base, book supporting means provided on said base, book engaging means to engage and progressively move books step by step to three cutting stages on said book supporting means, a knife carrier mounted for reciprocative movement toward and away from said base, means to actuate said knife carrier, five knives mounted on said knife carrier, one knife being disposed at the first cutting stage to trim the front edge of a book unit, two knives being disposed at the second stage to cut a first book from the book unit, two knives being disposed at the third stage to cut a second book from the book unit, said book engaging means including pairs of clamping jaws, one jaw of each pair being movable relative to its companion jaw whereby a book may be engaged at its back and front edge between the jaws, means to actuate said pairs of clamping jaws to engage and disengage books disposed therebetween and to transfer the books from one stage to a subsequent stage of the machine, said last mentioned means including a lost-motion mechanism which causes the clamping jaws to remain at rest during the period when the knives are cutting through the books.

16. In a book trimming machine, a base, book supporting means provided on said base, book engaging means to engage and progressively move books step by step to three cutting stages on said book supporting means, a knife carrier mounted for reciprocative movement toward and away from said base, means to actuate said knife carrier, five knives mounted on said knife carrier, one knife being disposed at the first cutting stage to trim the front edge of a book unit, two knives being disposed at the second stage to cut a first book from the book unit, two knives being disposed at the third stage to cut a second book from the book unit, said book engaging means including a pair of similar feed units arranged side by side, each feed unit comprising a frame, a rack mounted for reciprocative movement along said frame, a front plate mounted on said rack, a pair of fixed clamping jaws secured on said front plate, a pair of movable clamping jaws joined together and slidably mounted on said front plate, means to reciprocate said rack, means to alternately raise and lower said frame, and jaw actuating means to move said movable clamping jaws toward and away from their respective fixed clamping jaws to engage, move and then disengage books being transferred from stage to stage.

17. In a book trimming machine, a base, book supporting means provided on said base, book engaging means to engage and progressively move books step by step to three cutting stages on said book supporting means, a knife carrier mounted for reciprocative movement toward and away from said base, means to actuate said knife carrier, five knives mounted on said knife carrier, one knife being disposed at the first cutting stage to trim the front edge of a book unit, two knives being disposed at the second stage to cut a first book from the book unit, two knives being disposed at the third stage to cut a second book from the book unit, said book engaging means including a pair of similar feed units arranged side by side, each feed unit comprising a frame, a rack mounted for reciprocative movement along said frame, a front plate mounted on said rack, a pair of fixed clamping jaws secured on said front plate, a pair of movable clamping jaws joined together and slidably mounted on said front plate, means to reciprocate said rack, means to alternately raise and lower said frame, jaw actuating means to move said movable clamping jaws toward and away from their respective fixed clamping jaws to engage, move and then disengage books being transferred from stage to stage, and means to adjust the position of said front plate on said rack to vary the spacing between the movable clamping jaws and their companion jaws to accommodate books of different widths.

18. A trimming machine according to claim 16 in which, said jaw actuating means comprises a cam plate secured to one of said movable clamping jaws and formed with a locking recess, a cam member to engage and move said cam plate to move the movable clamping jaws away from their respective fixed jaws, means to actuate said cam member to seat the latter in the cam plate locking recess, a trip arm to move said cam member from its seated position within said cam plate locking recess, and means operable to move said movable clamping jaws toward their respective fixed jaws.

19. A trimming machine according to claim 16 in which, said jaw actuating means comprises a cam plate secured to one of said movable clamping jaws and formed with a locking recess, a cam member to engage and move said cam plate to move the movable clamping jaws away from their respective fixed jaws, means to actuate said cam member to seat the latter in the cam plate locking recess, a trip arm to move said cam member from its seated position within said cam plate locking recess, a latch to engage and hold the movable clamping jaws in their open position after movement of the cam member from its locking recess, means to move said latch out of engagement with said movable clamping jaws, and a tension spring to draw said movable clamping jaws toward their respective fixed jaws.

CARL A. ROESSL.
ROBERT P. FENDIUS.

REFERENCES CITED

The following references are of record in the file of this patent:

UNITED STATES PATENTS

| Number | Name | Date |
| --- | --- | --- |
| 1,757,623 | Frazier | May 6, 1930 |
| 1,798,017 | Free | Mar. 24, 1931 |
| 2,017,462 | Kleinebeig | Oct. 15, 1935 |
| 2,482,685 | Moyer | Sept. 20, 1949 |